(12) United States Patent
Iwasaki

(10) Patent No.: US 6,701,229 B2
(45) Date of Patent: Mar. 2, 2004

(54) VEHICLE DRIVE SYSTEM

(75) Inventor: Yasukazu Iwasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 211 days.

(21) Appl. No.: 10/001,972

(22) Filed: Dec. 5, 2001

(65) Prior Publication Data

US 2002/0096376 A1 Jul. 25, 2002

(30) Foreign Application Priority Data

Jan. 19, 2001 (JP) ........................................ 2001-010906

(51) Int. Cl.[7] ................................................ H01M 8/04
(52) U.S. Cl. ............................ 701/22; 180/65.3; 477/3
(58) Field of Search .......................... 701/22; 180/65.2, 180/65.9, 65.7, 65.8; 477/2, 3; 290/45, 40 C; 475/5

(56) References Cited

U.S. PATENT DOCUMENTS 6,453,222 B1 * 9/2002 Lasson et al. ................ 701/22
6,484,830 B1 * 11/2002 Gruenwald et al. ........ 180/65.2
6,492,742 B1 * 12/2002 Fujikawa et al. .......... 290/40 C

FOREIGN PATENT DOCUMENTS

JP  09-007618  1/1997
JP  10-080008  3/1998

* cited by examiner

*Primary Examiner*—Richard M. Camby
(74) *Attorney, Agent, or Firm*—Foley & Lardner

(57) ABSTRACT

A vehicle drive system includes a power generation device (150) which generates power using fuel, a battery (112) which stores the power generated by the power generation device, and a rotating machine (113) which drives the vehicle using the power supplied from the power generation device or the battery, and regenerates power when the vehicle is decelerating. A controller (115) computes a smoothed value of the electrical load of the vehicle, computes a running load command value supplied to the power generation device (150) based on the smoothed electrical load value, computes the power regenerated by the rotating machine (113), corrects the running load command value based on the regenerated power, and controls the power generation device (150) based on the corrected running load command value.

17 Claims, 13 Drawing Sheets

VEHICLE DRIVE SYSTEM

FIELD OF THE INVENTION

This invention relates to a vehicle driven by a motor (fuel cell vehicle, series hybrid vehicle) wherein electrical energy is generated using fuel, and this electrical energy is used to drive the motor.

BACKGROUND OF THE INVENTION

JP-A-H9-7618 published by the Japanese Patent Office in 1997 discloses a method wherein a running load of a fuel cell of a fuel cell vehicle is determined based on the average value of the electrical load of the vehicle. This method aims to reduce the capacity of the battery mounted on the vehicle to conserve the power generated by the fuel cell, and lower the response required of the fuel cell.

SUMMARY OF THE INVENTION

However, in an approach where the running load of the fuel cell is decided based on the average value of electrical load, when the motor is regenerating power during vehicle deceleration or on a downward slope, it frequently occurs that the fuel cell system also generates power under a high running load. In such a situation, the sum of regenerated power and generated power becomes excessive, so the power cannot be completely stored by the battery or the battery electrodes may deteriorate due to overcharging.

In particular, in a situation where the brakes are fully applied from the state where the vehicle was running near the maximum rated load, it is necessary to charge the battery simultaneously with the maximum generated power and the maximum regenerated power, and if the battery capacity is set to comply with these requirements, the size of the battery will be increased, costs will rise and it will be more difficult to install the battery on the vehicle.

It is therefore an object of this invention to correct the running load calculated from the electrical load value according to the regenerated power, avoid enlargement of the battery, and perform power management efficiently.

In order to achieve above object, this invention provides a vehicle drive system, comprising a power generation device which generates power using fuel, a battery which stores power generated by the power generation device, a rotating machine which drives the vehicle using power supplied from the power generation device and battery, and regenerates power when the vehicle is decelerating, and a controller which functions to compute a smoothed value of an electrical load of the vehicle, compute a running load command value supplied to the power generation device based on the smoothed electrical load value, determine the regeneration state of the rotating machine, correct the running load command value based on the regeneration state of the rotating machine, and control the power generation device based on the corrected running load command value.

The details as well as other features and advantages of this invention are set forth in the remainder of the specification and are shown in the accompanying drawings.

DESCRIPTION OF THE PREFERRED EMBODIMENTS

Figure 1:
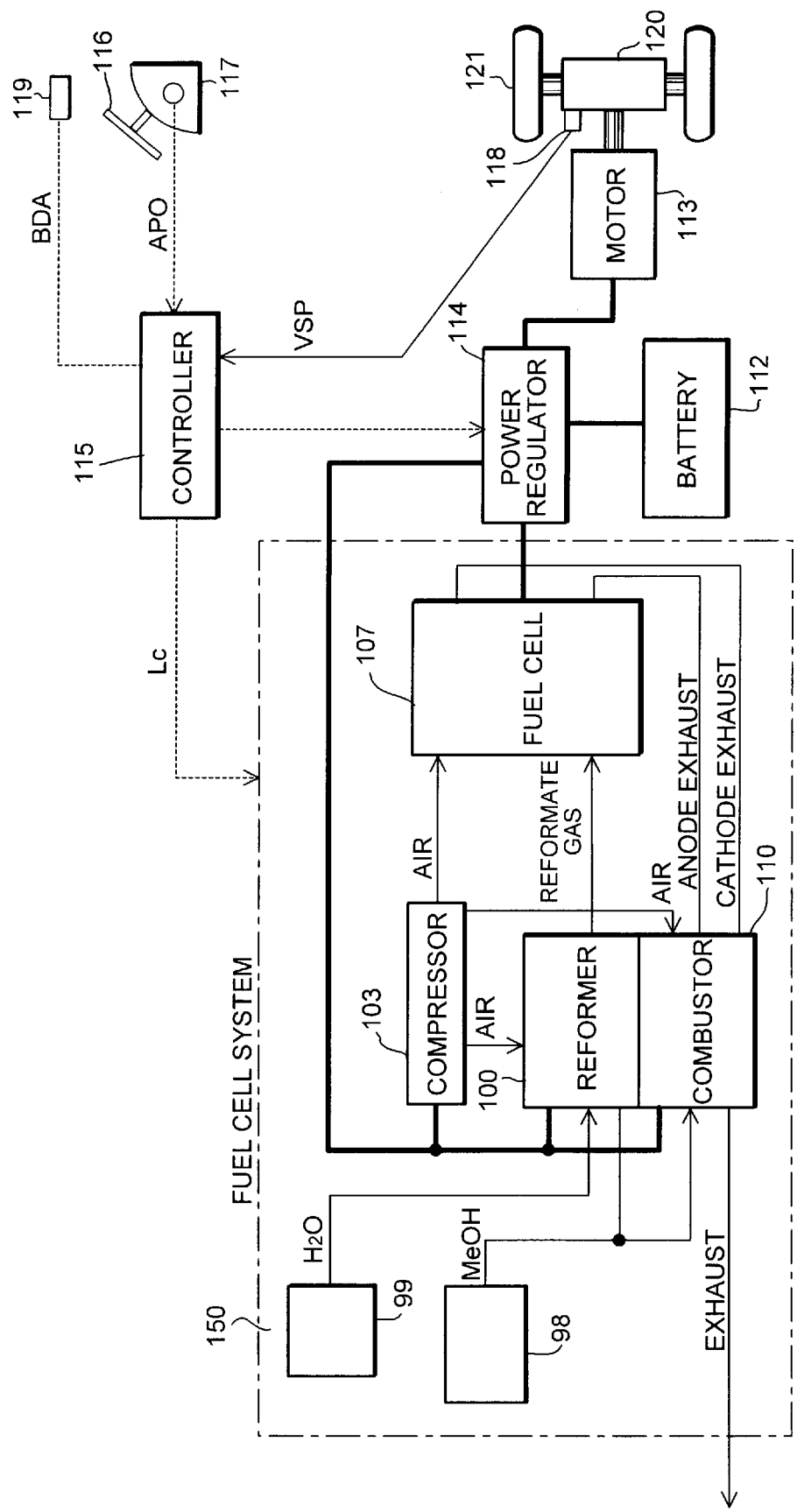
FIG. 1 is a schematic block diagram of a vehicle drive system relating to this invention.

Referring to FIG. 1 of the drawings, a vehicle drive system according to this invention is provided with a fuel cell system 150 and a battery 112 as a source of power supplied to a motor 113.

The fuel cell system 150 is provided with a reformer 100, a compressor 103, a fuel cell 107 and a combustor 110.

The reformer 100 performs steam reforming using methanol (MeOH) from a methanol tank 98 and water ($H_2O$) from a water tank 99, and generates reformate gas containing hydrogen. The reformer 100 also performs reforming by the partial oxidation of methanol using air supplied from the compressor 103. The steam reforming is an endothermic reaction and the partial oxidation is an exothermic reaction. Reformate gas is supplied to the anode of the fuel cell 107, and air from the compressor 103 is supplied to the cathode of the fuel cell 107. The fuel cell 107 generates power using the hydrogen in the reformate gas and the oxygen in the air.

As for the hydrogen in the reformate gas 104 and the oxygen in the air, not all is consumed by the fuel cell 107, part being sent to the combustor 110 (anode exhaust, cathode exhaust). The anode exhaust and the cathode exhaust are burnt with the methanol supplied from the methanol tank 98 and the air from the compressor 103 if needed. The heat of combustion in the combustor 110 is reused to vaporize methanol and water, or the heat absorbed by steam reforming.

A battery 112 stores the surplus power generated by the fuel cell 107 or the power regenerated by the motor 113 when the vehicle decelerates. When all the demands of the motor 113, compressor 103, reformer 100 and combustor 110 cannot be met by the power generation of the fuel cell 107 alone, the battery 112 discharges and the insufficiency is compensated. The load share among the fuel cell 107 and battery 112 is decided by a power regulator 114.

The motor 113 is connected to the power regulator 114, power being supplied to the motor 113 from the fuel cell 107 or battery 112. The motor 113 drives drive wheels 121 via a gear 120. During deceleration, the motor 113 functions as a generator and the battery 112 is charged with the regenerated power.

A controller 115 includes one, two or more microprocessors, an ROM and RAM, and an I/O interface. A depression amount APO of the accelerator pedal 116 detected by a sensor 117, a vehicle speed VSP detected by a sensor 118 and a brake pedal depression amount BDA detected by a sensor 119 are input to the controller 115. The controller 115 computes a required power Pd from the accelerator depression amount APO and vehicle speed VSP, and outputs a running load command value Lc according to the required power Pd and the regeneration state to the fuel cell system 150. The regeneration state can be determined from the brake pedal depression amount BDA. The controller 115 also directs the power distribution between the fuel cell system 150 and the battery 112 to the power regulator 114.

Figure 2:
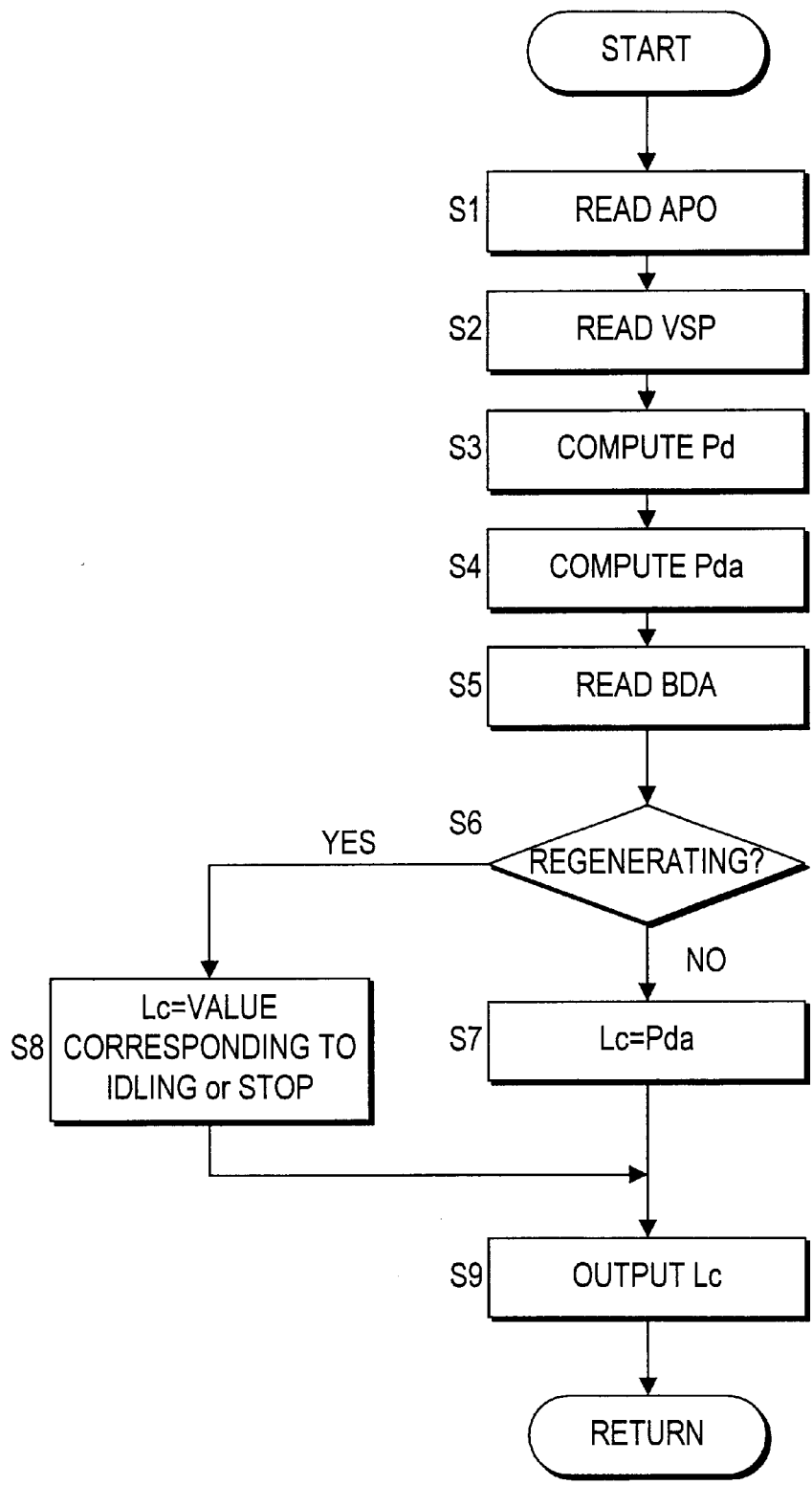
FIG. 2 is a flowchart of a power management routine.

FIG. 2 shows the power management routine performed by the controller 115. This routine is performed periodically by the controller 115.

First, in a step S1, the accelerator depression amount APO is read, and in a step S2, the vehicle speed VSP is read.

In a step S3, the required value Pd of electrical load which is the power required to run the vehicle is computed based on the accelerator depression amount APO and the vehicle speed VSP.

In a step S4, a time average value Pda (for example, the average value for the past 20 seconds) of the required value of the electrical load from the present time to a predetermined previous time is computed.

In a step S5, the brake pedal depression amount BDA is read.

In a step S6, when the brake pedal depression amount BDA exceeds a predetermined value, it is determined that power is being regenerated by the motor 113. The presence or absence of regenerated power may also be determined by computing the regenerated power Pr based on the brake pedal depression amount BDA and the vehicle speed VSP.

When it is determined that there is no regenerated power, the routine proceeds to a step S7, and the running load command value Lc is set to the time average value Pda of the required value of electrical load. When there is regenerated power, the routine proceeds to a step S8, and the running load command value Lc is set to the value corresponding to idle running or stop.

In a step S9, the running load command value Lc is output to the fuel cell system 150, and the fuel cell system 150 is operated under the running load Lc.

Figure 3:
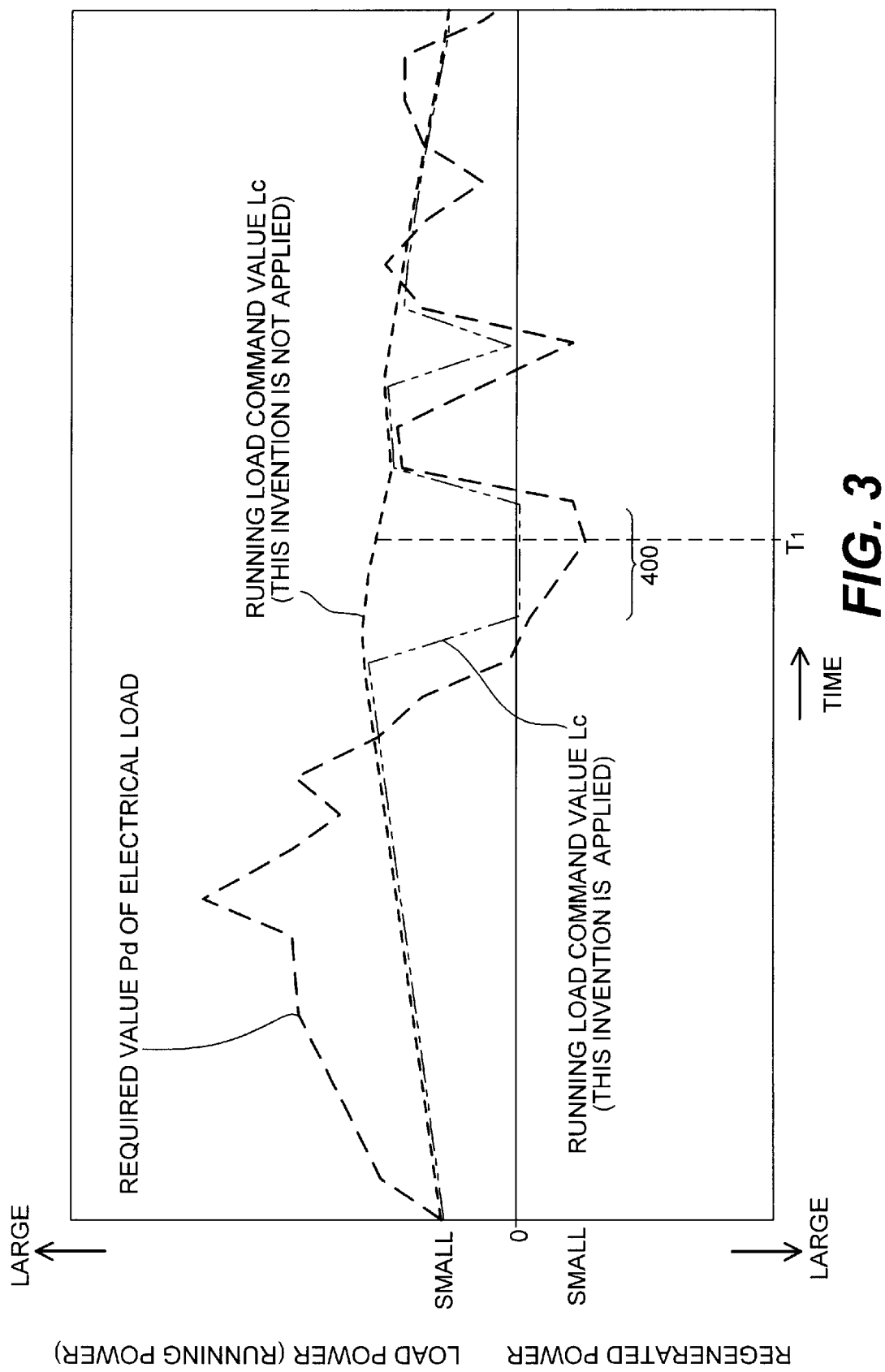
FIG. 3 is a time chart showing a power management state (running load, regenerated power).

In FIG. 3, the running load command value Lc to the fuel cell system 150 under the above-mentioned power management is compared with the case where this invention is not applied. In a region 400 where the motor 113 regenerates power, although the running load command value Lc is high when not applying this invention, according to this embodiment, the running load command value Lc is corrected to the value corresponding to idle running or stop (considered as zero load in the figure for convenience).

Figure 4:
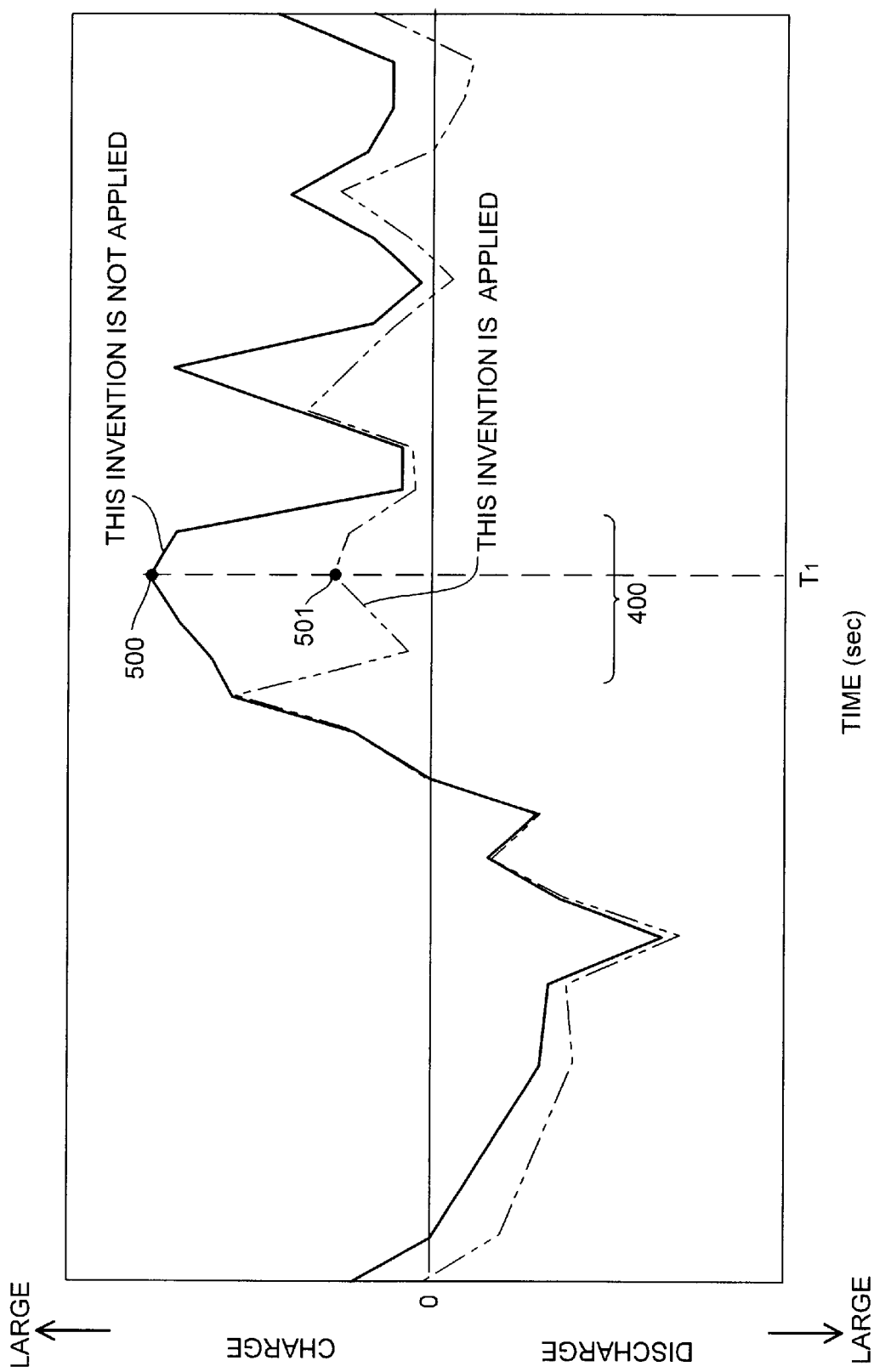
FIG. 4 is a time chart showing a power management state (battery charging/discharging power).

The charging/discharging power of the battery 112 is shown in FIG. 4. The charge power at a time T1 at which the maximum regenerated power is generated, is a very high value when not applying this invention (point 500). On the other hand, in this embodiment, it is suppressed low (point 501). When power regeneration has occurred, the battery 112 is charged mainly by regenerated power.

FIGS. 3 and 4 show some typical city road running patterns. When the brake is suddenly applied, the charge power when not applying this invention is a still larger value than the point 500.

However, according to this embodiment, when regenerated power has occurred or disappears, the running load command value Lc varies rapidly. Therefore, if the response of the fuel cell system 150 is low and cannot follow the running command value Lc, the power difference will be absorbed by the battery 112.

Figure 5:
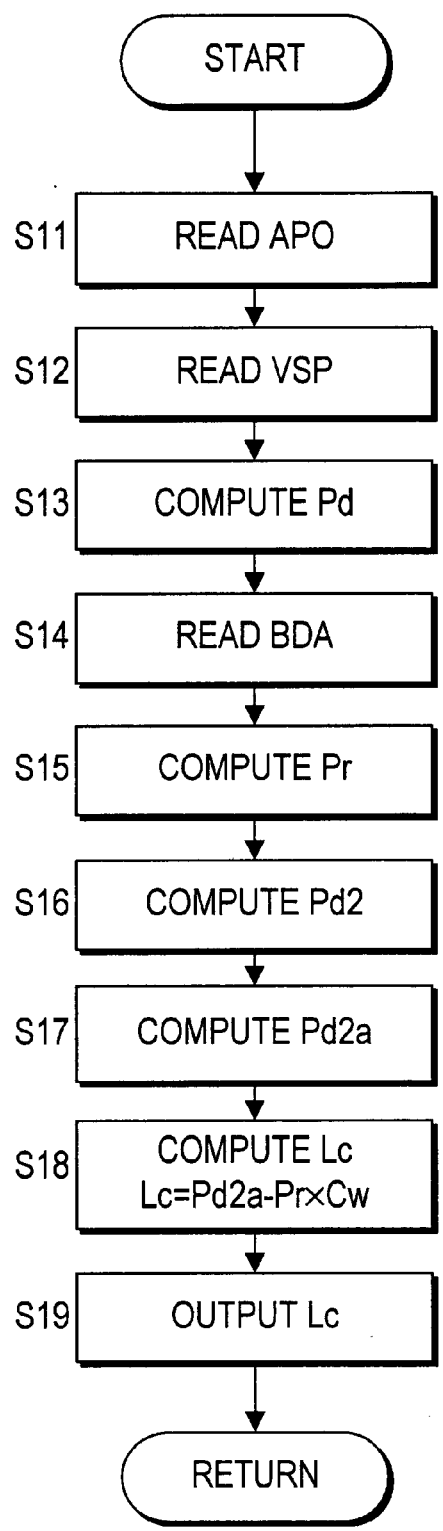
FIG. 5 is a flowchart showing a power management routine according to a second embodiment.

FIG. 5 shows another example of the power management routine performed by the controller 115 (second embodiment). This routine is performed periodically by the controller 115.

First, the accelerator depression amount APO is read in a step S11, and the vehicle speed VSP is read in a step S12.

In a step S13, the required value Pd of electrical load which is the power required for running the vehicle is computed based on the accelerator depression amount APO and the vehicle speed VSP.

In a step S14, the brake pedal depression amount BDA is read.

In a step S15, the regenerated power Pr is computed from the vehicle speed VSP and the brake pedal depression amount BDA.

In a step S16, the required value Pd of the electrical load which is the power required to run the vehicle in the step S13 is set positive, the regenerated power Pr in the step S15 is set negative, and a required value Pd2 of the electrical load taking account of the regenerated power is computed.

In a step S17, a time average Pd2a from the present time to a predetermined prior time (e.g., time average for the past 20 seconds) of the required value Pd2 of the electrical load is computed.

Figure 10:
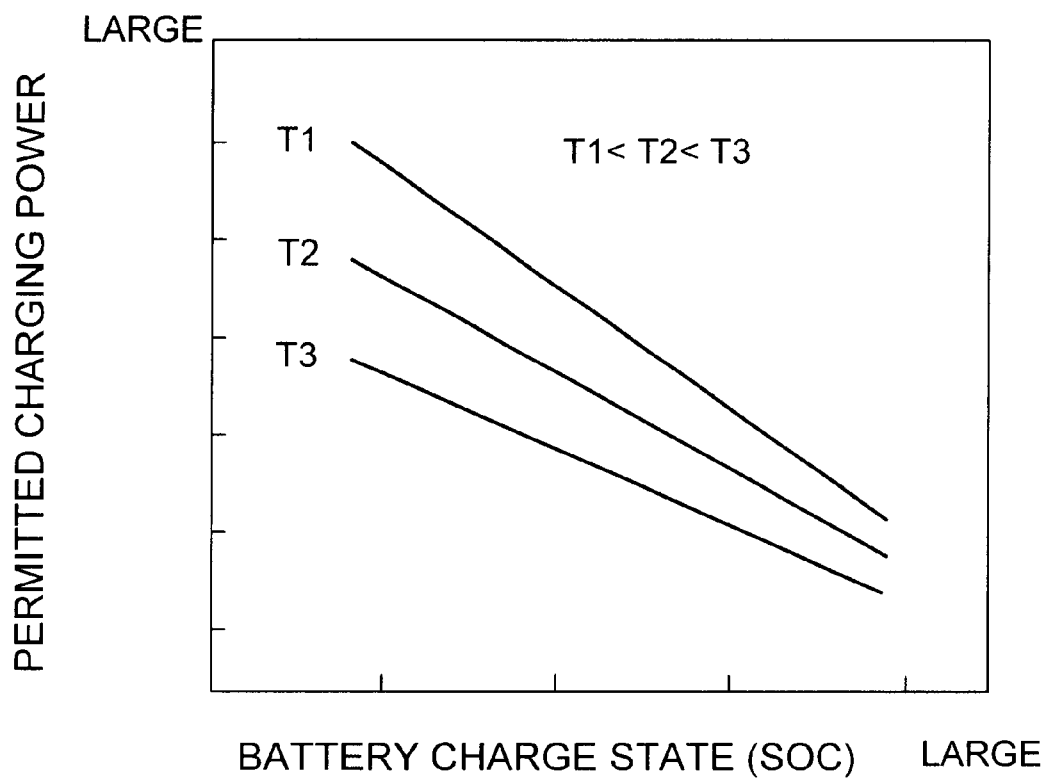
FIG. 10 is a map specifying the relation between a battery charge state and permitted charging power of the battery.

In a step S18, the running load command value Lc of the fuel cell system 150 is computed by subtracting a value obtained by multiplying the regenerated power Pr by a weighting correction coefficient Cw, from the time average value Pd2a. The coefficient Cw is set to a value according to the charge amount and temperature of the battery 112. For example, the coefficient Cw is set to a smaller value the lower the battery charge amount and the lower the battery temperature, due to the fact that the power with which the battery 112 can be charged increases under these conditions, as shown in FIG. 10.

In a step S19, the running load command value Lc is output to the fuel cell system 150, and the fuel cell system 150 runs under this running load Lc.

Figure 6:
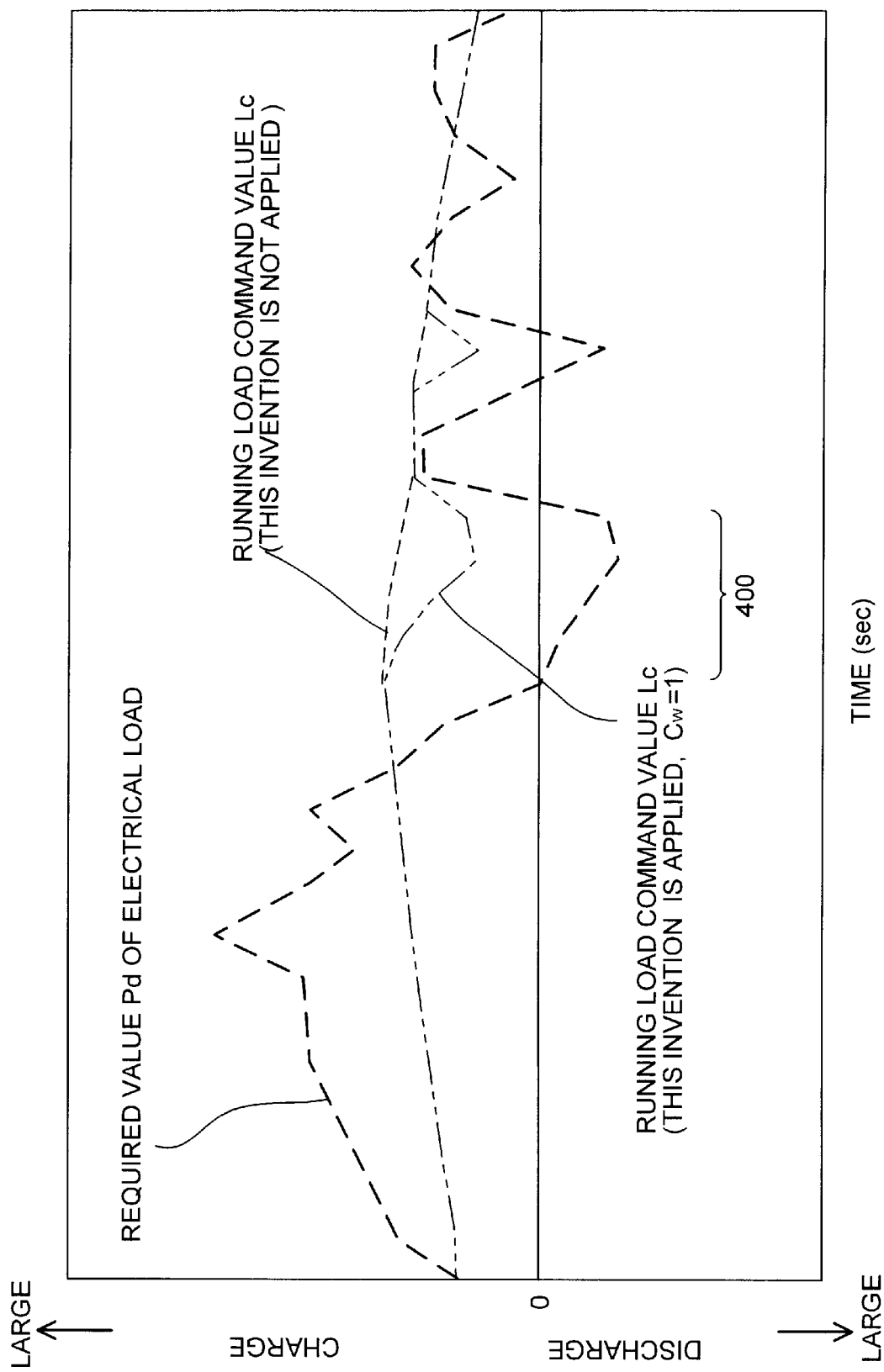
FIG. 6 is a time chart showing a power management state in the case where a weighting correction coefficient is 1.
Figure 7:
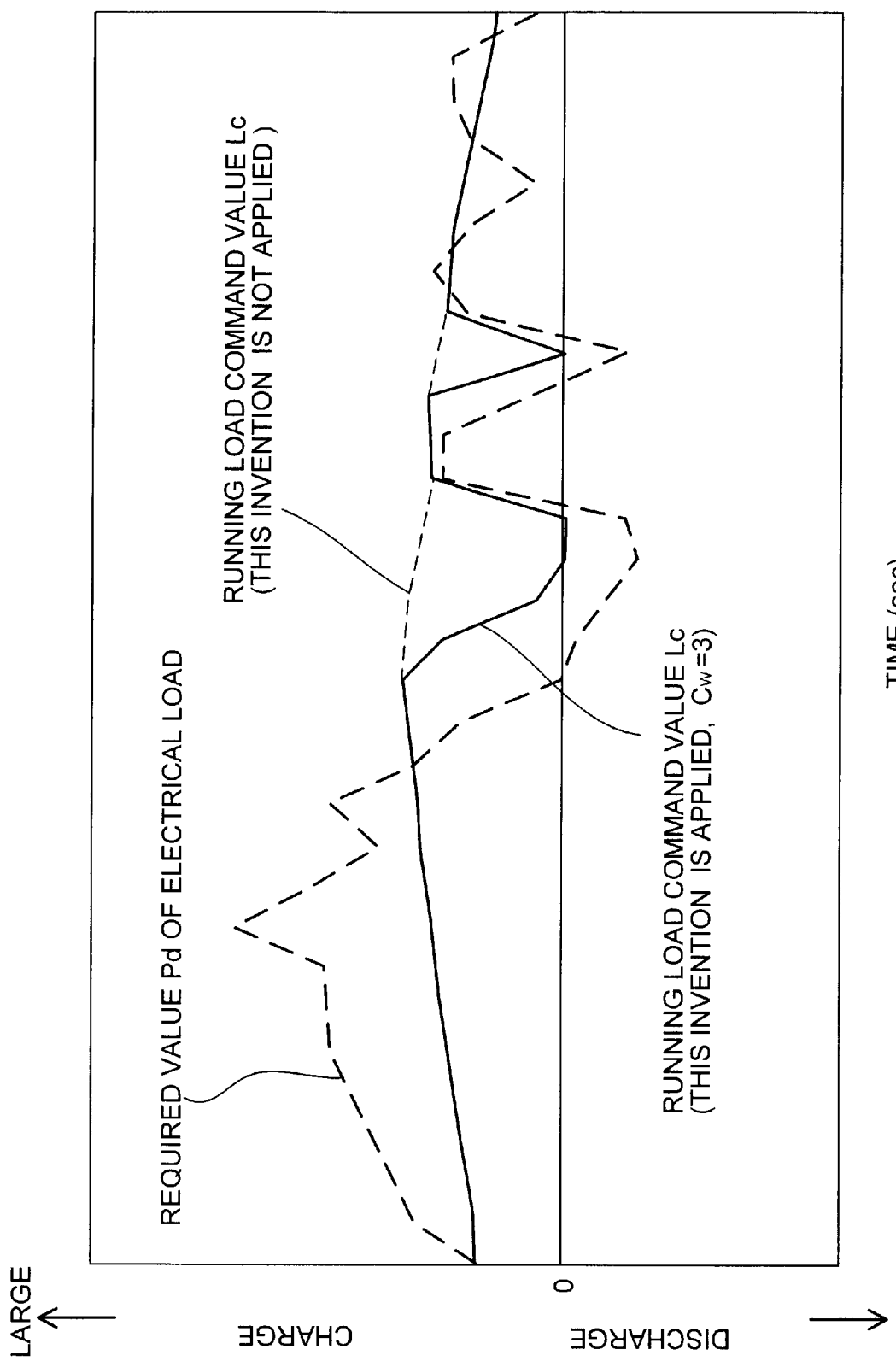
FIG. 7 is a time chart showing a power management state in the case where the weighting correction coefficient is 3.

FIGS. 6 and 7 compare the case where the running load command value Lc is supplied to the fuel cell system 150 according to the control of the second embodiment, and the case where this invention is not applied.

FIG. 6 shows the case where the weighting correction coefficient Cw is 1, and FIG. 7 shows the case where the weighting correction coefficient Cw is 3. In a region 400 where regenerated power is produced as shown in the figure, the running load command value Lc is high when this invention is not applied, but according to this embodiment, the running load command value Lc is corrected to be smaller according to the production of regenerated power.

Figure 8:
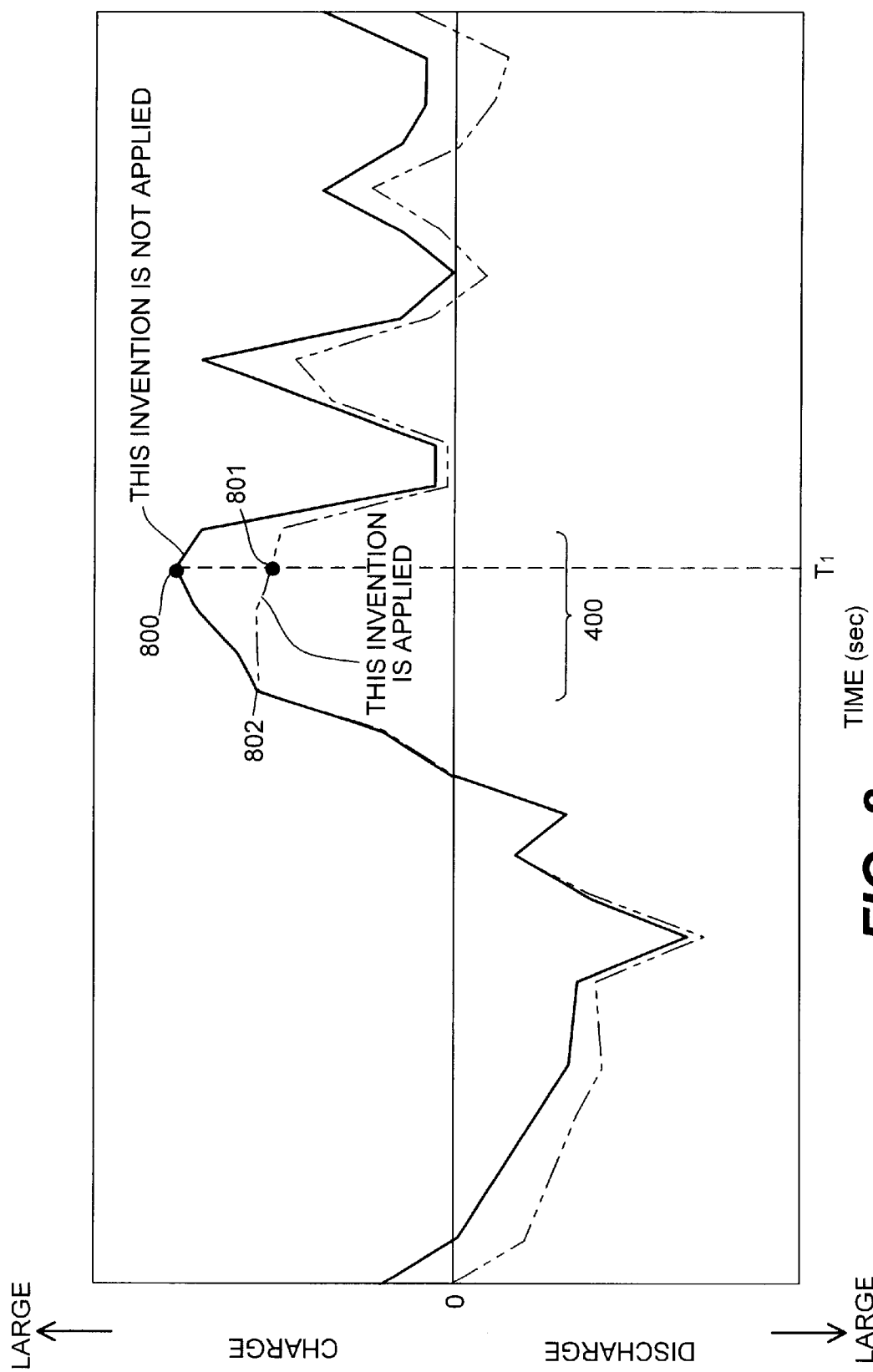
FIG. 8 is a time chart showing a power management state (battery charging/discharging power) according to the second embodiment.

FIG. 8 shows the charging power of the battery 112. At a time T1 when the maximum regenerated power is produced, the charging power is a very high value when this invention is not applied (point 800), but according to this embodiment, it is suppressed to a low value compared to the case when this invention is not applied (point 801), and the charging power in the region 400 when regenerated power is produced is of the same order as the charging power immediately prior to production of regenerated power (point 802).

According to this embodiment, the running load command value Lc when regenerated power is produced or consumed varies fairly slowly, so the fuel cell system 150 can easily follow the command value Lc of the running load.

Figure 9:
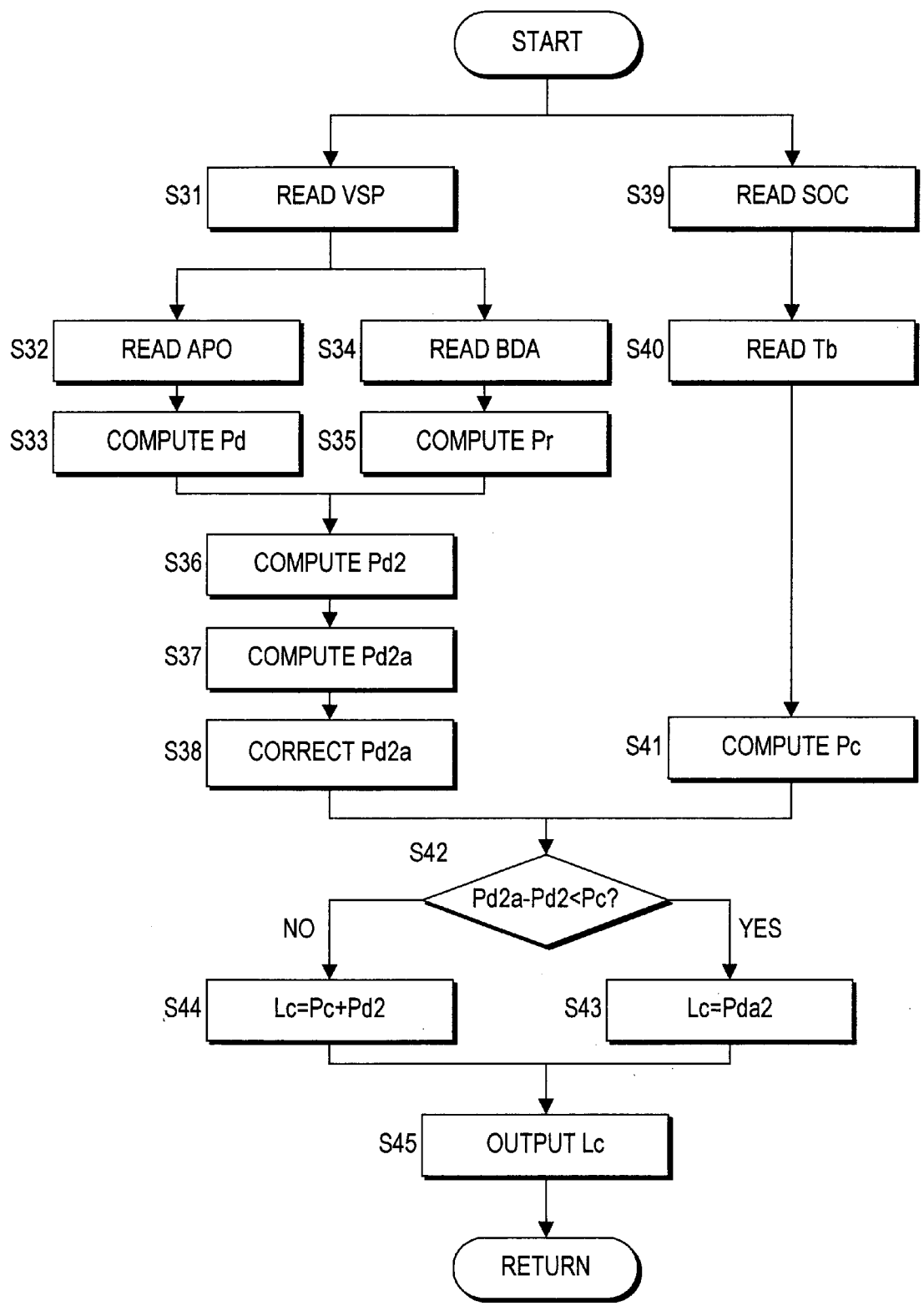
FIG. 9 is a flowchart showing a power management routine according to a third embodiment.

FIG. 9 shows yet another embodiment of the power management routine performed by the controller 115 (third embodiment). This routine is performed periodically by the controller 115.

First, in a step S31, the vehicle speed VSP is read, and in a step S32 the accelerator depression amount APO is read.

In a step S33, the required value Pd of the electrical load which is the power required to run the vehicle is computed from the accelerator depression amount APO and the vehicle speed VSP.

In a step S34, the brake pedal depression amount BDA is read. In a step S35, the regenerated power Pr is computed from the vehicle speed VSP and brake pedal depression amount BDA.

In a step S36, the regenerated power Pr is subtracted from the required value Pd of the electrical load, and the required value Pd2 of the electrical load taking account of the regeneration is computed.

In a step S37, the time average Pd2$a$ from the present time to a predetermined prior time (e.g., time average for the past 20 seconds) of the required value Pd2 of the electrical load is computed.

In a step S38, the time average Pd2$a$ of the required value of the electrical load is corrected according to the regenerated power Pr. When the regenerated power Pr is large, Pd2$a$ is corrected to a small value to suppress the charging amount of the fuel cell system 150.

In a step S39, the charge state SOC of the battery 112 is read, and in a step S40, a temperature Tb of the battery 112 is read.

In a step S41, a permitted charging power Pc of the battery 112 is computed by looking at a map shown in FIG. 10 from the charge state SOC and temperature Tb of the battery 112.

In a step S42, it is determined whether a value obtained by subtracting Pd2 from Pd2$a$ is less than Pc. If the determination result of the step S42 is true, the routine proceeds to a step S43, the running load command value Lc to the fuel cell system 150 is set to Pda2, and correction of the running load command value Lc is not performed. The value obtained by subtracting Pd2 from Pd2$a$ is the charging power of the battery 112.

When the determination result of the step S42 is false, the routine proceeds to a step S44, and the running load command value Lc to the fuel cell system 150 is set to a value obtained by adding Pd2 to Pc. At this time, Pc is the charging power of the battery 112. The correction amount of the running load command value Lc is the minimum amount within the range wherein charging of the battery 112 is permitted.

Therefore, according to this embodiment, the charging amount of the battery 112 is controlled to the maximum permitted charging power. As a result, the correction amount of the running load command value Lc can be suppressed to the minimum, and the margins of the output, capacity, etc. of the battery 112, can be set lower than in the preceding embodiments. Therefore, the cost of the battery can be reduced still further, the size of the battery is reduced and it is easier to install the battery in the vehicle. Further, recharging of the battery after power has been extracted, can be performed easily.

Next, a fourth embodiment will be described. The following control is performed in a combination of the above embodiments, and the running load command value Lc is further corrected by looking up the map shown in FIG. 11.

Figure 12:
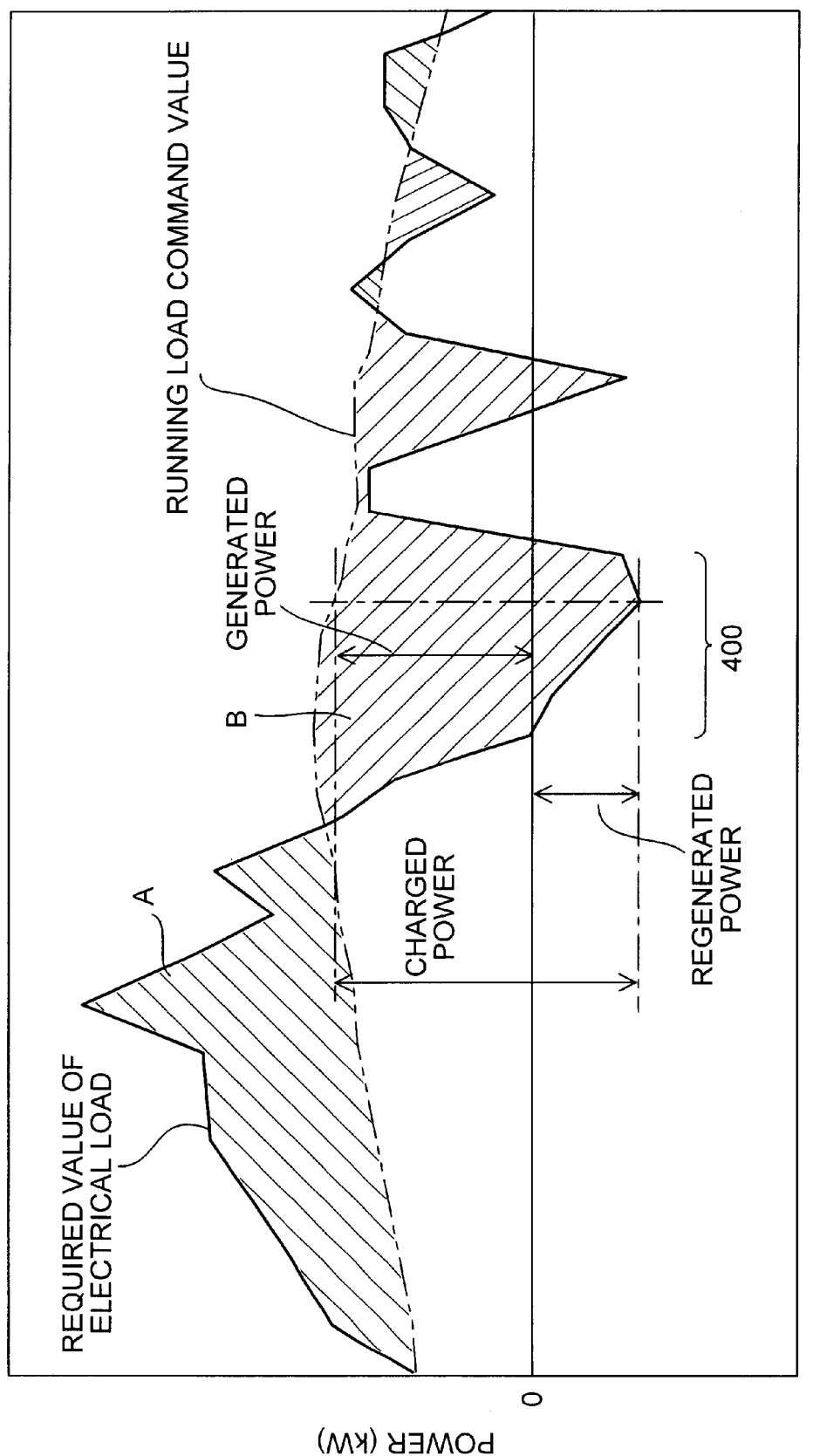
FIG. 12 is a map for describing power management when this invention is not applied.

First, power management when this invention is not applied will be described referring to FIG. 12.

The region A is a region wherein the required value of electrical load is larger than the running load command value of the fuel cell system. In this region, the power generated by the fuel cell system is insufficient, and a power amount corresponding to this surface area is extracted from the battery.

On the other hand, the region B is a region wherein the required value of electrical load is less than the running load command value of the fuel cell system. In this region, the power generated by the fuel cell system is excessive, and the power amount corresponding to this surface area charges the battery. These two regions occur alternately, both charging and discharging of the battery taking place, and over a long period, the charging amount and discharging amount effectively balance each other. Thus, the average value of the charge state of the battery converges to its initial value.

However, in the first to third embodiments, in the region 400 where regenerated power is produced, the running load command value supplied to the fuel cell system 150 in region B is corrected to be smaller, so the surface area of the region where charging is performed decreases. Therefore, taking the average over a long period, power tends to be extracted from the battery 112 (the total discharging amount is larger than the total charging amount).

Figure 11:
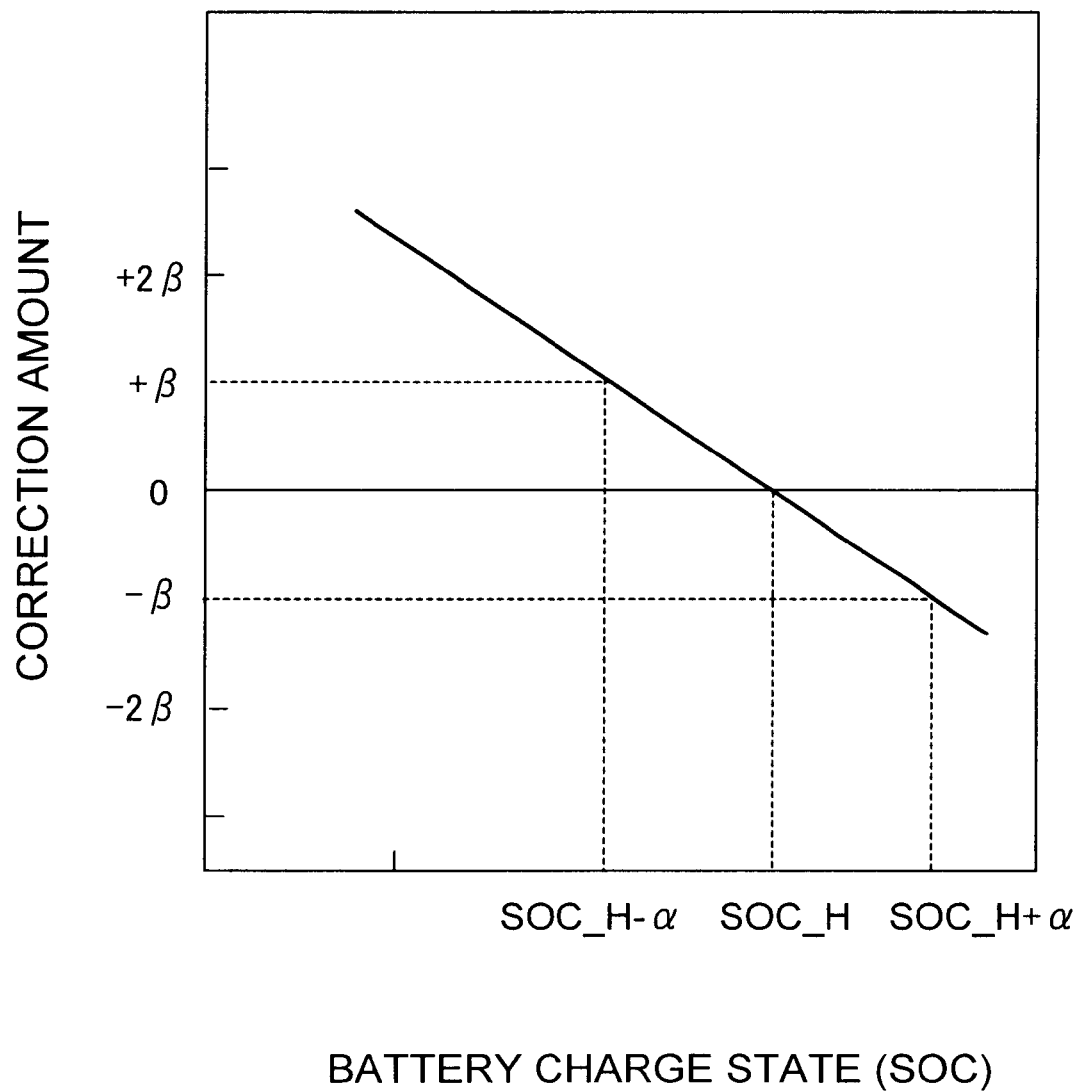
FIG. 11 is a map specifying the relation between a battery charge state and a correction amount.

However, in the fourth embodiment, the charge state SOC of the battery 112 is read, a correction is added to the time average of the required value of the electrical load or the running load command value of the fuel cell system 150 based on the correction map shown in FIG. 11, and due to this correction, the above tendency to extract battery power is prevented. In this correction, the charge state SOC converges to a value SOC_H corresponding to a correction amount of zero.

In the above embodiments, the electrical load was smoothed by the time average of the electrical load value, however it may be smoothed by another method, for example by a filter having a delay time constant.

Further, in addition to calculating the required value of electrical load from the vehicle speed and accelerator depression amount, it may also be calculated from the accelerator depression amount alone or from other parameters, for example position data, vehicle speed data, etc. from a drive navigation system.

The regenerated power may also be computed not only from the vehicle speed and brake depression amount, but also from other parameters. Further, the permitted charging power amount of the battery was estimated from the charge state of the battery and its temperature, but it may be estimated from the charge state of the battery alone, or another computation method may be used.

The corrections when regenerated power is produced are not limited to the methods of the above embodiments. For example, the regenerated power may be subtracted from the smoothed value of the electrical load of the vehicle to obtain the running load command value supplied to the fuel cell system.

In the above embodiments, the fuel cell system comprises a reforming system, but this invention may also be applied to a vehicle comprising a fuel cell system comprising a hydrogen storage system.

Figure 13:
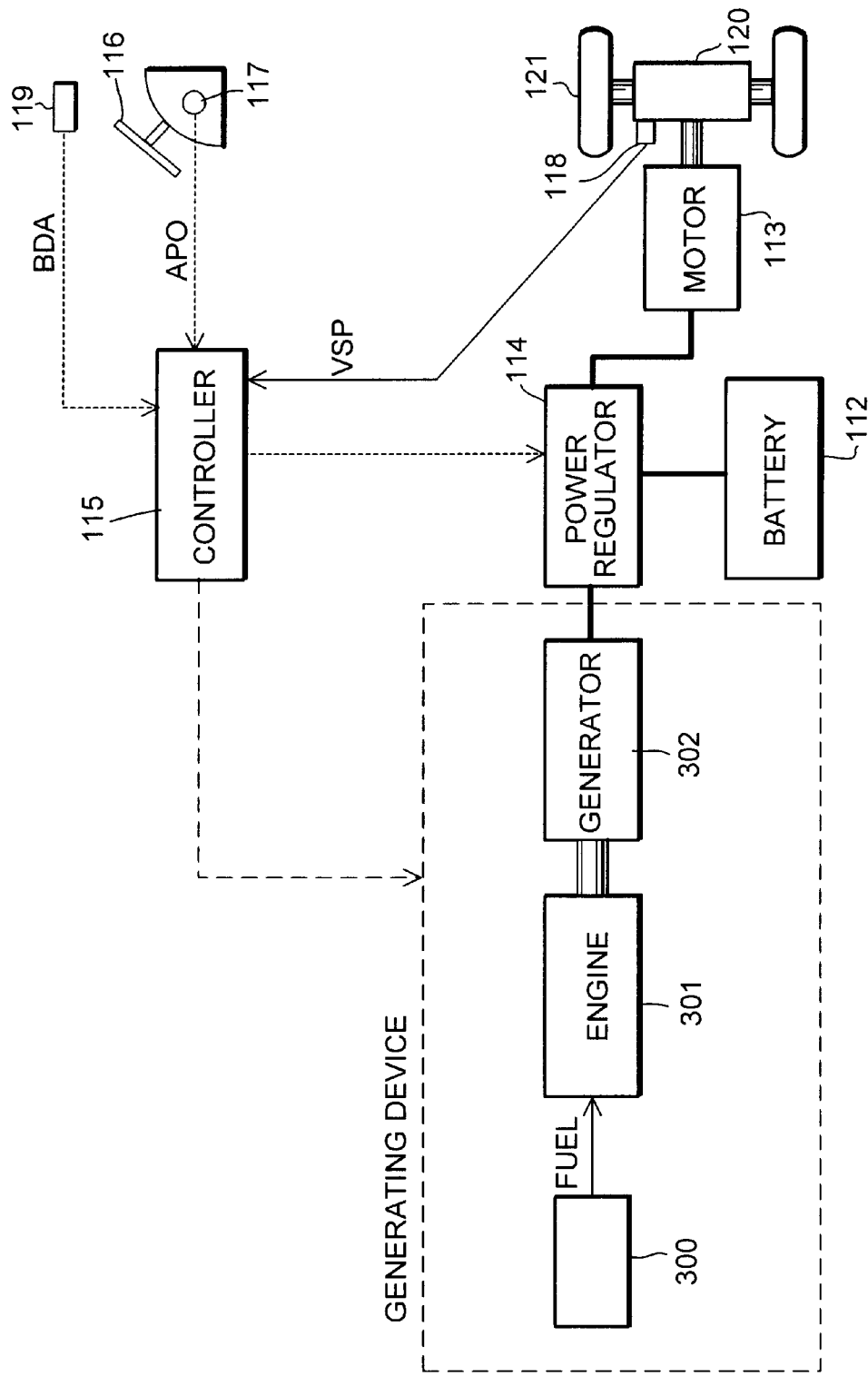
FIG. 13 shows a schematic drawing of a series hybrid vehicle which can apply this invention.

Further, this invention is not limited to a fuel cell vehicle, and may be applied also to a series hybrid vehicle wherein a generator is driven by an internal combustion engine. For example, this invention may be applied to the series hybrid vehicle shown in FIG. 13. An engine 301 is run by fuel supplied from a fuel tank 300, a generator 302 is driven by the engine 301, and the power generated by the generator 302 is supplied to the battery 112 or the motor 113 via the power regulator 114. The combination of the internal combustion engine 301 and generator 302 corresponds to the fuel cell system 150 of the above embodiments, and the invention may be applied.

In the above embodiments, power management was considered only insofar as it applied to the running load, but it may also be applied to the electrical load including the power required to drive auxiliary devices such as an air conditioner.

The entire contents of Japanese Patent Application P2001-10906 (filed Jan. 19, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A vehicle drive system, comprising:
    a power generation device which generates power using fuel,
    a battery which stores power generated by the power generation device,
    a rotating machine which drives the vehicle using power supplied from the power generation device and battery, and regenerates power when the vehicle is decelerating, and
    a controller which functions to:
        compute a smoothed value of an electrical load of the vehicle,
        compute a running load command value supplied to the power generation device based on the smoothed electrical load value,
        determine the regeneration state of the rotating machine,
        correct the running load command value based on the regeneration state of the rotating machine, and
        control the power generation device based on the corrected running load command value.

2. The system as defined in claim 1, wherein:
    the controller further functions to
        compute the power regenerated by the rotating machine, and
        correct the running load command value so that the running load command value is a value obtained by subtracting the regenerated power from the smoothed electrical load value.

3. The system as defined in claim 1, wherein:
    the controller further functions to correct the running load command value so that the running load command value is a value corresponding to idle running or stop when the rotating machine regenerates power.

4. The system as defined in claim 2, wherein:
    the controller further functions to apply a weighting to the regenerated power when the regenerated power is subtracted from the smoothed electrical load.

5. The system as defined in claim 1, wherein:
    the controller further functions to correct the running load command value so that the charging power of the battery does not exceed a permitted charging power of the battery.

6. The system as defined in claim 5, wherein:
    the controller further functions to compute the permitted charging power of the battery based on the charge state of the battery.

7. The system as defined in claim 5, wherein:
    the controller further functions to compute the permitted charging power of the battery based on the temperature of the battery.

8. The system as defined in claim 5, wherein:
    the controller further functions to compute the battery charging power by subtracting the electrical load value from a value corresponding to the running load of the power generation device.

9. The system as defined in claim 1, wherein:
    the controller further functions to correct the running load command value according to the charge state of the battery.

10. The system as defined in claim 1, wherein:
    the controller further functions to correct the running load command value according to the temperature of the battery.

11. The system as defined in claim 4, wherein:
the controller further functions to modify the degree of weighting based on the charge state of the battery.

12. The system as defined in claim 4, wherein:
the controller further functions to modify the degree of weighting based on the temperature of the battery.

13. The system as defined in claim 1, wherein:
the power generation device comprises a fuel cell which generates power using hydrogen and air.

14. The system as defined in claim 1, wherein:
the power generation device comprises an internal combustion engine and a generator driven by the engine.

15. The system as defined in claim 2, wherein:
the controller further functions to calculate the power regenerated by the rotating machine based on the braking state of the vehicle.

16. The system as defined in claim 1, further comprising:
a sensor which detects an accelerator depression amount, and
a sensor which detects a vehicle speed, and wherein the controller further functions to:
compute the electrical load value of the vehicle based on the accelerator depression amount and vehicle speed.

17. A vehicle drive system, comprising:
a power generation device which generates power using fuel, a battery which stores power generated by the power generation device, a rotating machine which drives the vehicle using power supplied from the power generation device and battery, and regenerates power when the vehicle is decelerating, means for computing a smoothed value of an electrical load of the vehicle, means for computing a running load command value supplied to the power generation device based on the smoothed electrical load value, means for determining the regeneration state of the rotating machine, means for correcting the running load command value based on the regeneration state of the rotating machine, and means for controlling the power generation device based on the corrected running load command value.

* * * * *